US011882426B2

(12) United States Patent
Fersch et al.

(10) Patent No.: US 11,882,426 B2
(45) Date of Patent: *Jan. 23, 2024

(54) METHODS, APPARATUS AND SYSTEMS FOR THREE DEGREES OF FREEDOM (3DOF+) EXTENSION OF MPEG-H 3D AUDIO

(71) Applicant: DOLBY INTERNATIONAL AB, Amsterdam (NL)

(72) Inventors: Christof Fersch, Neumarkt (DE); Leon Terentiv, Erlangen (DE); Daniel Fischer, Fuerth (DE)

(73) Assignee: Dolby International AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/743,442

(22) Filed: May 12, 2022

(65) Prior Publication Data

US 2022/0272481 A1 Aug. 25, 2022

Related U.S. Application Data

(63) Continuation of application No. 17/045,983, filed as application No. PCT/EP2019/058954 on Apr. 9, 2019, now Pat. No. 11,375,332.

(Continued)

(51) Int. Cl.
*H04S 7/00* (2006.01)

(52) U.S. Cl.
CPC ........... *H04S 7/303* (2013.01); *H04S 2400/11* (2013.01)

(58) Field of Classification Search
None
See application file for complete search history.

(56) References Cited

U.S. PATENT DOCUMENTS

| | | | |
|---|---|---|---|
| 7,398,207 | B2 | 7/2008 | Riedl |
| 7,533,346 | B2 | 5/2009 | McGrath |

(Continued)

FOREIGN PATENT DOCUMENTS

| | | |
|---|---|---|
| CN | 1656821 | 8/2005 |
| JP | 2001251698 A | 9/2001 |

(Continued)

OTHER PUBLICATIONS

Cchiariglione, Leonardo “MPEG Work Plan” ISO/IEC JTC1/SC 29/WG 11 N16603, Geneva, CH, Jan. 2017.

(Continued)

*Primary Examiner* — Qin Zhu

(57) ABSTRACT

Described is a method of processing position information indicative of an object position of an audio object, wherein the object position is usable for rendering of the audio object, that comprises: obtaining listener orientation information indicative of an orientation of a listener's head; obtaining listener displacement information indicative of a displacement of the listener's head; determining the object position from the position information; modifying the object position based on the listener displacement information by applying a translation to the object position; and further modifying the modified object position based on the listener orientation information. Further described is a corresponding apparatus for processing position information indicative of an object position of an audio object, wherein the object position is usable for rendering of the audio object.

9 Claims, 5 Drawing Sheets

Related U.S. Application Data

(60) Provisional application No. 62/823,159, filed on Mar. 25, 2019, provisional application No. 62/695,446, filed on Jul. 9, 2018, provisional application No. 62/654,915, filed on Apr. 9, 2018.

(56) References Cited

U.S. PATENT DOCUMENTS

| | | | |
|---|---|---|---|
| 9,560,467 | B2 | 1/2017 | Gorzel |
| 9,807,534 | B2 | 10/2017 | Schneider |
| 2007/0016406 | A1 | 1/2007 | Thumpudi |
| 2009/0063159 | A1 | 3/2009 | Crockett |
| 2011/0196684 | A1 | 8/2011 | Koishida |
| 2012/0310654 | A1 | 12/2012 | Riedmiller |
| 2016/0073215 | A1 | 3/2016 | De Bruijn |
| 2016/0337777 | A1 | 11/2016 | Tsuji |
| 2017/0251323 | A1 | 8/2017 | Jo |
| 2017/0295446 | A1 | 10/2017 | Thagadur Shivappa |
| 2017/0366914 | A1 | 12/2017 | Stein |
| 2018/0046431 | A1 | 2/2018 | Thagadur Shivappa |
| 2018/0091918 | A1 | 3/2018 | Lee |
| 2018/0098173 | A1 | 4/2018 | Van Brandenburg |
| 2021/0014630 | A1 | 1/2021 | Leppänen |

FOREIGN PATENT DOCUMENTS

| | | | |
|---|---|---|---|
| RU | 2602346 | C2 | 11/2016 |
| WO | 2016208406 | | 12/2016 |
| WO | 2017098949 | | 6/2017 |
| WO | 20170178309 | W | 10/2017 |

OTHER PUBLICATIONS

Kroon, B. et al "Summary on MPEG-1 Visual Activities on 6Dof" ISO/IEC JTC1/SC29/WG11 MPEG 2018/N17460, Jan. 2018, Gwangju, Korea.

Trevino, J. et al "Presenting Spatial Sound to Moving Listeners Using High-Order Ambisonics" AES International, Jul. 2016, New York.

METHODS, APPARATUS AND SYSTEMS FOR THREE DEGREES OF FREEDOM (3DOF+) EXTENSION OF MPEG-H 3D AUDIO

CROSS-REFERENCE TO RELATED APPLICATIONS

This application is a continuation of U.S. patent application Ser. No. 17/045,983, filed Oct. 7, 2020, now U.S. Pat. No. 11,375,332, issued on Jun. 28, 2022, which claims priority PCT/EP2019/058954, filed Apr. 9, 2019, which claims priority to the following priority applications: U.S. provisional application 62/654,915 filed Apr. 9, 2018; U.S. provisional application 62/695,446, filed Jul. 9, 2018 and U.S. provisional application 62/823,159, filed Mar. 25, 2019, which are hereby incorporated by reference.

TECHNICAL FIELD

The present disclosure relates to methods and apparatus for processing position information indicative of an audio object position, and information indicative of positional displacement of a listener's head.

BACKGROUND

The First Edition (Oct. 15, 2015) and Amendments 1-4 of the ISO/IEC 23008-3 MPEG-H 3D Audio standard do not provide for allowing small translational movements of a user's head in a Three Degrees of Freedom (3DoF) environment.

SUMMARY

The First Edition (Oct. 15, 2015) and Amendments 1-4 of the ISO/IEC 23008-3 MPEG-H 3D Audio standard provide functionality for the possibility of a 3DoF environment, where a user (listener) performs head-rotation actions. However, such functionality, at best only supports rotational scene displacement signaling and the corresponding rendering. This means that the audio scene can remain spatially stationary under the change of the listener's head orientation, which corresponds to a 3DoF property. However, there is no possibility to account for small translational movement of the user's head within the present MPEG-H 3D Audio ecosystem.

Thus, there is a need for methods and apparatus for processing position information of audio objects that can account for small translational movement of the user's head, potentially in conjunction with rotational movement of the user's head.

The present disclosure provides apparatus and systems for processing position information, having the features of the respective independent and dependent claims.

According to an aspect of the disclosure, a method of processing position information indicative of an audio object's position is described, where the processing may be compliant with the MPEG-H 3D Audio standard. The object position may be usable for rendering of the audio object. The audio object may be included in object-based audio content, together with its position information. The position information may be (part of) metadata for the audio object. The audio content (e.g., the audio object together with its position information) may be conveyed in an encoded audio bitstream. The method may include receiving the audio content (e.g., the encoded audio bitstream). The method may include obtaining listener orientation information indicative of an orientation of a listener's head. The listener may be referred to as a user, for example of an audio decoder performing the method. The orientation of the listener's head (listener orientation) may be an orientation of the listener's head with respect to a nominal orientation. The method may further include obtaining listener displacement information indicative of a displacement of the listener's head. The displacement of the listener's head may be a displacement with respect to a nominal listening position. The nominal listening position (or nominal listener position) may be a default position (e.g., predetermined position, expected position for the listener's head, or sweet spot of a speaker arrangement). The listener orientation information and the listener displacement information may be obtained via an MPEG-H 3D Audio decoder input interface. The listener orientation information and the listener displacement information may be derived based on sensor information. The combination of orientation information and position information may be referred to as pose information. The method may further include determining the object position from the position information. For example, the object position may be extracted from the position information. Determination (e.g., extraction) of the object position may further be based on information on a geometry of a speaker arrangement of one or more speakers in a listening environment. The object position may also be referred to as channel position of the audio object. The method may further include modifying the object position based on the listener displacement information by applying a translation to the object position. Modifying the object position may relate to correcting the object position for the displacement of the listener's head from the nominal listening position. In other words, modifying the object position may relate to applying positional displacement compensation to the object position. The method may yet further include further modifying the modified object position based on the listener orientation information, for example by applying a rotational transformation to the modified object position (e.g., a rotation with respect to the listener's head or the nominal listening position). Further modifying the modified object position for rendering the audio object may involve rotational audio scene displacement.

Configured as described above, the proposed method provides a more realistic listening experience especially for audio objects that are located close to the listener's head. In addition to the three (rotational) degrees of freedom conventionally offered to the listener in a 3DoF environment, the proposed method can account also for translational movements of the listener's head. This enables the listener to approach close audio objects from different angles and even sides. For example, the listener can listen to a "mosquito" audio object that is close to the listener's head from different angles by slightly moving their head, possibly in addition to rotating their head. In consequence, the proposed method can enable an improved, more realistic, immersive listening experience for the listener.

In some embodiments, modifying the object position and further modifying the modified object position may be performed such that the audio object, after being rendered to one or more real or virtual speakers in accordance with the further modified object position, is psychoacoustically perceived by the listener as originating from a fixed position relative to a nominal listening position, regardless of the displacement of the listener's head from the nominal listening position and the orientation of the listener's head with respect to a nominal orientation. Accordingly, the audio object may be perceived to move relative to the listener's head when the listener's head undergoes the displacement from the nominal listening position. Likewise, the audio object may be perceived to rotate relative to the listener's head when the listener's head undergoes a change of orientation from the nominal orientation. The one or more speakers may be part of a headset, for example, or may be part of a speaker arrangement (e.g., a 2.1, 5.1, 7.1, etc. speaker arrangement).

In some embodiments, modifying the object position based on the listener displacement information may be performed by translating the object position by a vector that positively correlates to magnitude and negatively correlates to direction of a vector of displacement of the listener's head from a nominal listening position.

Thereby, it is ensured that close audio objects are perceived by the listener to move in accord with their head movement. This contributes to a more realistic listening experience for those audio objects.

In some embodiments, the listener displacement information may be indicative of a displacement of the listener's head from a nominal listening position by a small positional displacement. For example, an absolute value of the displacement may be not more than 0.5 m.

The displacement may be expressed in Cartesian coordinates (e.g., x, y, z) or in spherical coordinates (e.g., azimuth, elevation, radius).

In some embodiments, the listener displacement information may be indicative of a displacement of the listener's head from a nominal listening position that is achievable by the listener moving their upper body and/or head. Thus, the displacement may be achievable for the listener without moving their lower body. For example, the displacement of the listener's head may be achievable when the listener is sitting in a chair.

In some embodiments, the position information may include an indication of a distance of the audio object from a nominal listening position. The distance (radius) may be smaller than 0.5 m. For example, the distance may be smaller than 1 cm. Alternatively, the distance of the audio object from the nominal listening position may be set to a default value by the decoder.

In some embodiments, the listener orientation information may include information on a yaw, a pitch, and a roll of the listener's head. The yaw, pitch, roll may be given with respect to a nominal orientation (e.g., reference orientation) of the listener's head.

In some embodiments, the listener displacement information may include information on the listener's head displacement from a nominal listening position expressed in Cartesian coordinates or in spherical coordinates. Thus, the displacement may be expressed in terms of x, y, z coordinates for Cartesian coordinates, and in terms of azimuth, elevation, radius coordinates for spherical coordinates.

In some embodiments, the method may further include detecting the orientation of the listener's head by wearable and/or stationary equipment. Likewise, the method may further include detecting the displacement of the listener's head from a nominal listening position by wearable and/or stationary equipment. The wearable equipment may be, correspond to, and/or include, a headset or an augmented reality (AR)/virtual reality (VR) headset, for example. The stationary equipment may be, correspond to, and/or include, camera sensors, for example. This allows to obtain accurate information on the displacement and/or orientation of the listener's head, and thereby enables realistic treatment of close audio objects in accordance with the orientation and/or displacement.

In some embodiments, the method may further include rendering the audio object to one or more real or virtual speakers in accordance with the further modified object position. For example, the audio object may be rendered to the left and right speakers of a headset.

In some embodiments, the rendering may be performed to take into account sonic occlusion for small distances of the audio object from the listener's head, based on head-related transfer functions (HRTFs) for the listener's head. Thereby, rendering of close audio objects will be perceived as even more realistic by the listener.

In some embodiments, the further modified object position may be adjusted to the input format used by an MPEG-H 3D Audio renderer. In some embodiments, the rendering may be performed using an MPEG-H 3D Audio renderer. In some embodiments, the processing may be performed using an MPEG-H 3D Audio decoder. In some embodiments, the processing may be performed by a scene displacement unit of an MPEG-H 3D Audio decoder. Accordingly, the proposed method allows to implement a limited Six Degrees of Freedom (6DoF) experience (i.e., 3DoF+) in the framework of the MPEG-H 3D Audio standard.

According to another aspect of the disclosure, a further method of processing position information indicative of an object position of an audio object is described. The object position may be usable for rendering of the audio object. The method may include obtaining listener displacement information indicative of a displacement of the listener's head. The method may further include determining the object position from the position information. The method may yet further include modifying the object position based on the listener displacement information by applying a translation to the object position.

Configured as described above, the proposed method provides a more realistic listening experience especially for audio objects that are located close to the listener's head. By being able to account for small translational movements of the listener's head, the proposed method enables the listener to approach close audio objects from different angles and even sides. In consequence, the proposed method can enable an improved, more realistic immersive listening experience for the listener.

In some embodiments, modifying the object position based on the listener displacement information may be performed such that the audio object, after being rendered to one or more real or virtual speakers in accordance with the modified object position, is psychoacoustically perceived by the listener as originating from a fixed position relative to a nominal listening position, regardless of the displacement of the listener's head from the nominal listening position.

In some embodiments, modifying the object position based on the listener displacement information may be performed by translating the object position by a vector that positively correlates to magnitude and negatively correlates to direction of a vector of displacement of the listener's head from a nominal listening position.

According to another aspect of the disclosure, a further method of processing position information indicative of an object position of an audio object is described. The object position may be usable for rendering of the audio object. The method may include obtaining listener orientation information indicative of an orientation of a listener's head. The method may further include determining the object position from the position information. The method may yet further include modifying the object position based on the listener orientation information, for example by applying a rotational transformation to the object position (e.g., a rotation with respect to the listener's head or the nominal listening position).

Configured as described above, the proposed method can account for the orientation of the listener's head to provide the listener with a more realistic listening experience.

In some embodiments, modifying the object position based on the listener orientation information may be performed such that the audio object, after being rendered to one or more real or virtual speakers in accordance with the modified object position, is psychoacoustically perceived by the listener as originating from a fixed position relative to a nominal listening position, regardless of the orientation of the listener's head with respect to a nominal orientation.

According to another aspect of the disclosure, an apparatus for processing position information indicative of an object position of an audio object is described. The object position may be usable for rendering of the audio object. The apparatus may include a processor and a memory coupled to the processor. The processor may be adapted to obtain listener orientation information indicative of an orientation of a listener's head. The processor may be further adapted to obtain listener displacement information indicative of a displacement of the listener's head. The processor may be further adapted to determine the object position from the position information. The processor may be further adapted to modify the object position based on the listener displacement information by applying a translation to the object position. The processor may be yet further adapted to further modify the modified object position based on the listener orientation information, for example by applying a rotational transformation to the modified object position (e.g., a rotation with respect to the listener's head or the nominal listening position).

In some embodiments, the processor may be adapted to modify the object position and further modify the modified object position such that the audio object, after being rendered to one or more real or virtual speakers in accordance with the further modified object position, is psychoacoustically perceived by the listener as originating from a fixed position relative to a nominal listening position, regardless of the displacement of the listener's head from the nominal listening position and the orientation of the listener's head with respect to a nominal orientation.

In some embodiments, the processor may be adapted to modify the object position based on the listener displacement information by translating the object position by a vector that positively correlates to magnitude and negatively correlates to direction of a vector of displacement of the listener's head from a nominal listening position.

In some embodiments, the listener displacement information may be indicative of a displacement of the listener's head from a nominal listening position by a small positional displacement.

In some embodiments, the listener displacement information may be indicative of a displacement of the listener's head from a nominal listening position that is achievable by the listener moving their upper body and/or head.

In some embodiments, the position information may include an indication of a distance of the audio object from a nominal listening position.

In some embodiments, the listener orientation information may include information on a yaw, a pitch, and a roll of the listener's head.

In some embodiments, the listener displacement information may include information on the listener's head displacement from a nominal listening position expressed in Cartesian coordinates or in spherical coordinates.

In some embodiments, the apparatus may further include wearable and/or stationary equipment for detecting the orientation of the listener's head. In some embodiments, the apparatus may further include wearable and/or stationary equipment for detecting the displacement of the listener's head from a nominal listening position.

In some embodiments, the processor may be further adapted to render the audio object to one or more real or virtual speakers in accordance with the further modified object position.

In some embodiments, the processor may be adapted to perform the rendering taking into account sonic occlusion for small distances of the audio object from the listener's head, based on HRTFs for the listener's head.

In some embodiments, the processor may be adapted to adjust the further modified object position to the input format used by an MPEG-H 3D Audio renderer. In some embodiments, the rendering may be performed using an MPEG-H 3D Audio renderer. That is, the processor may implement an MPEG-H 3D Audio renderer. In some embodiments, the processor may be adapted to implement an MPEG-H 3D Audio decoder. In some embodiments, the processor may be adapted to implement a scene displacement unit of an MPEG-H 3D Audio decoder.

According to another aspect of the disclosure, a further apparatus for processing position information indicative of an object position of an audio object is described. The object position may be usable for rendering of the audio object. The apparatus may include a processor and a memory coupled to the processor. The processor may be adapted to obtain listener displacement information indicative of a displacement of the listener's head. The processor may be further adapted to determine the object position from the position information. The processor may be yet further adapted to modify the object position based on the listener displacement information by applying a translation to the object position.

In some embodiments, the processor may be adapted to modify the object position based on the listener displacement information such that the audio object, after being rendered to one or more real or virtual speakers in accordance with the modified object position, is psychoacoustically perceived by the listener as originating from a fixed position relative to a nominal listening position, regardless of the displacement of the listener's head from the nominal listening position.

In some embodiments, the processor may be adapted to modify the object position based on the listener displacement information by translating the object position by a vector that positively correlates to magnitude and negatively correlates to direction of a vector of displacement of the listener's head from a nominal listening position.

According to another aspect of the disclosure, a further apparatus for processing position information indicative of an object position of an audio object is described. The object position may be usable for rendering of the audio object. The apparatus may include a processor and a memory coupled to the processor. The processor may be adapted to obtain listener orientation information indicative of an orientation of a listener's head. The processor may be further adapted to determine the object position from the position information. The processor may be yet further adapted to modify the object position based on the listener orientation information, for example by applying a rotational transformation to the modified object position (e.g., a rotation with respect to the listener's head or the nominal listening position).

In some embodiments, the processor may be adapted to modify the object position based on the listener orientation information such that the audio object, after being rendered to one or more real or virtual speakers in accordance with the modified object position, is psychoacoustically perceived by the listener as originating from a fixed position relative to a nominal listening position, regardless of the orientation of the listener's head with respect to a nominal orientation.

According to yet another aspect, a system is described. The system may include an apparatus according to any of the above aspects and wearable and/or stationary equipment capable of detecting an orientation of a listener's head and detecting a displacement of the listener's head.

It will be appreciated that method steps and apparatus features may be interchanged in many ways. In particular, the details of the disclosed method can be implemented as an apparatus adapted to execute some or all or the steps of the method, and vice versa, as the skilled person will appreciate. In particular, it is understood that apparatus according to the disclosure may relate to apparatus for realizing or executing the methods according to the above embodiments and variations thereof, and that respective statements made with regard to the methods analogously apply to the corresponding apparatus. Likewise, it is understood that methods according to the disclosure may relate to methods of operating the apparatus according to the above embodiments and variations thereof, and that respective statements made with regard to the apparatus analogously apply to the corresponding methods.

BRIEF DESCRIPTION OF THE FIGURES

The invention is explained below in an exemplary manner with reference to the accompanying drawings, wherein FIG. 1 schematically illustrates an example of an MPEG-H 3D Audio System.

DETAILED DESCRIPTION

Figure 1:
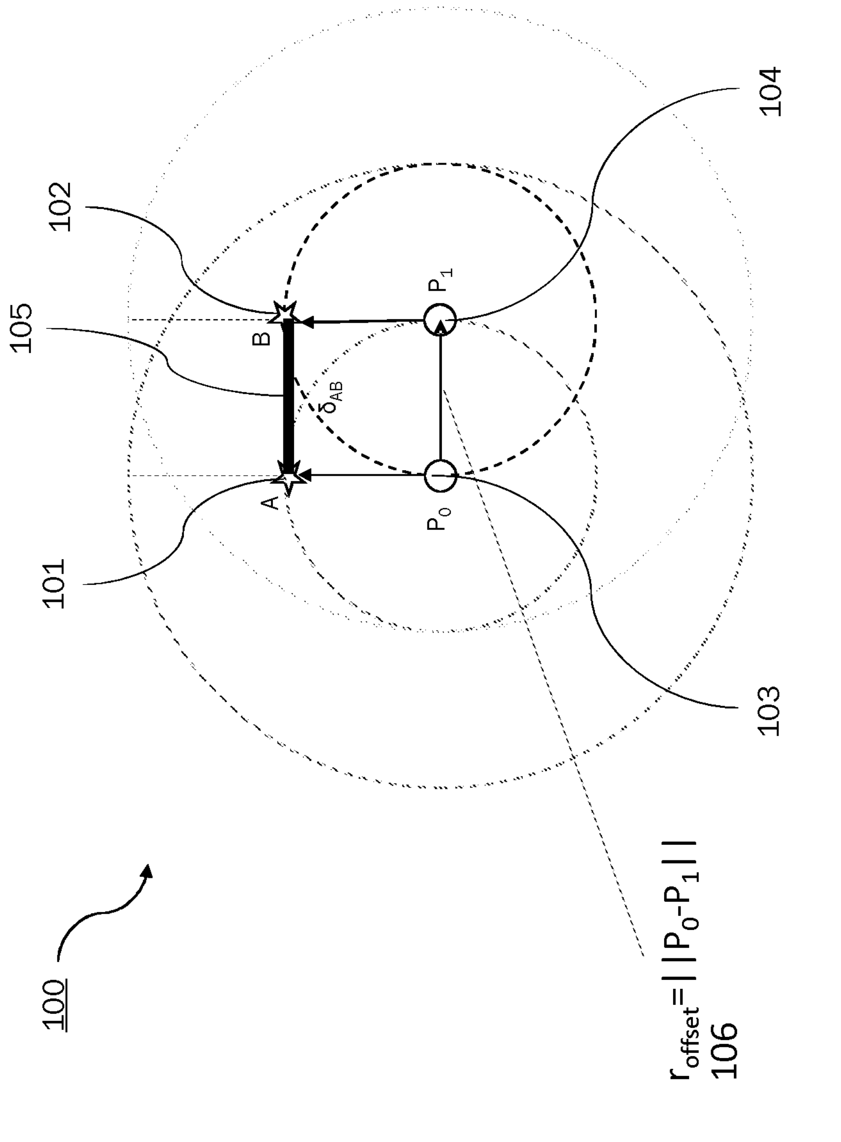

As used herein, 3DoF is typically a system that can correctly handle a user's head movement, in particular head rotation, specified with three parameters (e.g., yaw, pitch, roll). Such systems often are available in various gaming systems, such as Virtual Reality (VR)/Augmented Reality (AR)/Mixed Reality (MR) systems, or in other acoustic environments of such type.

As used herein, the user (e.g., of an audio decoder or reproduction system comprising an audio decoder) may also be referred to as a "listener."

As used herein, 3DoF+ shall mean that, in addition to a user's head movement, which can be handled correctly in a 3DoF system, small translational movements can also be handled.

As used herein, "small" shall indicate that the movements are limited to below a threshold which typically is 0.5 meters. This means that the movements are not larger than 0.5 meters from the user's original head position. For example, a user's movements are constrained by him/herself sitting on a chair.

As used herein, "MPEG-H 3D Audio" shall refer to the specification as standardized in ISO/IEC 23008-3 and/or any future amendments, editions or other versions thereof of the ISO/IEC 23008-3 standard.

In the context of the audio standards provided by the MPEG organization, the distinction between 3DoF and 3DoF+ can be defined as follows:

- 3DoF: allows a user to experience yaw, pitch, roll movement (e.g., of the user's head);
- 3DoF+: allows a user to experience yaw, pitch, roll movement and limited translational movement (e.g., of the user's head), for example while sitting on a chair.

The limited (small) head translational movements may be movements constrained to a certain movement radius. For example, the movements may be constrained due to the user being in a seated position, e.g., without the use of the lower body. The small head translational movements may relate or correspond to a displacement of the user's head with respect to a nominal listening position. The nominal listening position (or nominal listener position) may be a default position (such as, for example, a predetermined position, an expected position for the listener's head, or a sweet spot of a speaker arrangement).

The 3DoF+ experience may be comparable to a restricted 6DoF experience, where the translational movements can be described as limited or small head movements. In one example, audio is also rendered based on the user's head position and orientation, including possible sonic occlusion. The rendering may be performed to take into account sonic occlusion for small distances of an audio object from the listener's head, for example based on head-related transfer functions (HRTFs) for the listener's head.

With regard to methods, systems, apparatus and other devices that are compatible with the functionality set out by the MPEG-H 3D Audio standard, that may mean 3DoF+ is enabled for any future version(s) of MPEG standards, such as future versions of the Omnidirectional Media Format (e.g., as standardized in future versions of MPEG-I), and/or in any updates to MPEG-H Audio (e.g. amendments or newer standards based on MPEG-H 3D Audio standard), or any other related or supporting standards that may require updating (e.g., standards that specify certain types of metadata and SEI messages).

For example, an audio renderer that is normative to an audio standard set out in an MPEG-H 3D Audio specification, may be extended to include rendering of the audio scene to accurately account for user interaction with an audio scene, e.g., when a user moves their head slightly sideways.

The present invention provides various technical advantages, including the advantage of providing MPEG-H 3D Audio that is capable of handling 3DoF+ use-cases. The present invention extends the MPEG-H 3D Audio standard to support 3DoF+ functionality.

In order to support 3DoF+ functionality, the audio rendering system should take in account limited/small positional displacements of the user/listener's head. The positional displacements should be determined based on a relative offset from the initial position (i.e., the default position/nominal listening position). In one example, the magnitude of this offset (e.g., an offset of the radius which may be determined based on $r_{offset}=\|P_0-P_1\|$), where $P_0$ is the nominal listening position and $P_1$ is the displaced position of the listener's head) is maximally about 0.5 m. In another example, the magnitude of the offset is limited to be an offset that is achievable only whilst the user is seated on a chair and does not perform lower body movement (but their head is moving relative to their body). This (small) offset distance results in very little (perceptual) level and panning difference for distant audio objects. However, for close objects, even such small offset distance may become perceptually relevant. Indeed, a listener's head movement may have a perceptual effect on perceiving where is the location of the correct audio object localization. This perceptual effect can stay significant (i.e., be perceptually noticeable by the user/listener) as long as a ratio between (i) a user's head displacement (e.g., $r_{offset}=\|P_0-P_1\|$) and a distance to an audio object (e.g., r) trigonometrically results in angles that are in a range of psychoacoustical ability of users to detect sound direction. Such a range can vary for different audio renderer settings, audio material and playback configuration. For instance, assuming that the localization accuracy range is of e.g., +/−3° with +/−0.25 m side-to-side movement freedom of the listener's head, this would correspond to ~5 m of object distance.

For objects that are close to the listener, (e.g., objects at a distance <1 m from the user), proper handling of the positional displacement of the listener's head is crucial for 3DoF+ scenarios, as there are significant perceptual effects during both panning and level changes.

One example of handling of close-to-listener objects is, for example, when an audio object (e.g., a mosquito) is positioned very close to a listener's face. An audio system, such as an audio system that provides VR/AR/MR capabilities, should allow the user to perceive this audio object from all sides and angles even while the user is undergoing small translational head movements. For example, the user should be able to accurately perceive the object (e.g. mosquito) even while the user is moving their head without moving their lower body.

However, a system that is compatible with the present MPEG-H 3D Audio specification cannot currently handle this correctly. Instead, using a system compatible with the MPEG-H 3D Audio system results in the "mosquito" being perceived from the wrong position relative to the user. In scenarios that involve 3DoF+ performance, small translational movements should result in significant differences in the perception of the audio object (e.g. when moving one's head to the left, the "mosquito" audio object should be perceived from the right side relative to the user's head, etc.).

The MPEG-H 3D Audio standard includes bitstream syntax that allows for the signaling of object distance information via a bit stream syntax, e.g., via an object_metadata( )-syntax element (starting from 0.5 m).

A syntax element prodMetadataConfig( ) may be introduced to the bitstream provided by the MPEG-H 3D Audio standard which can be used to signal that object distances are very close to a listener. For example, the syntax prodMetadataConfig( ) may signal that the distance between a user and an object is less than a certain threshold distance (e.g., <1 cm).

Figure 2:
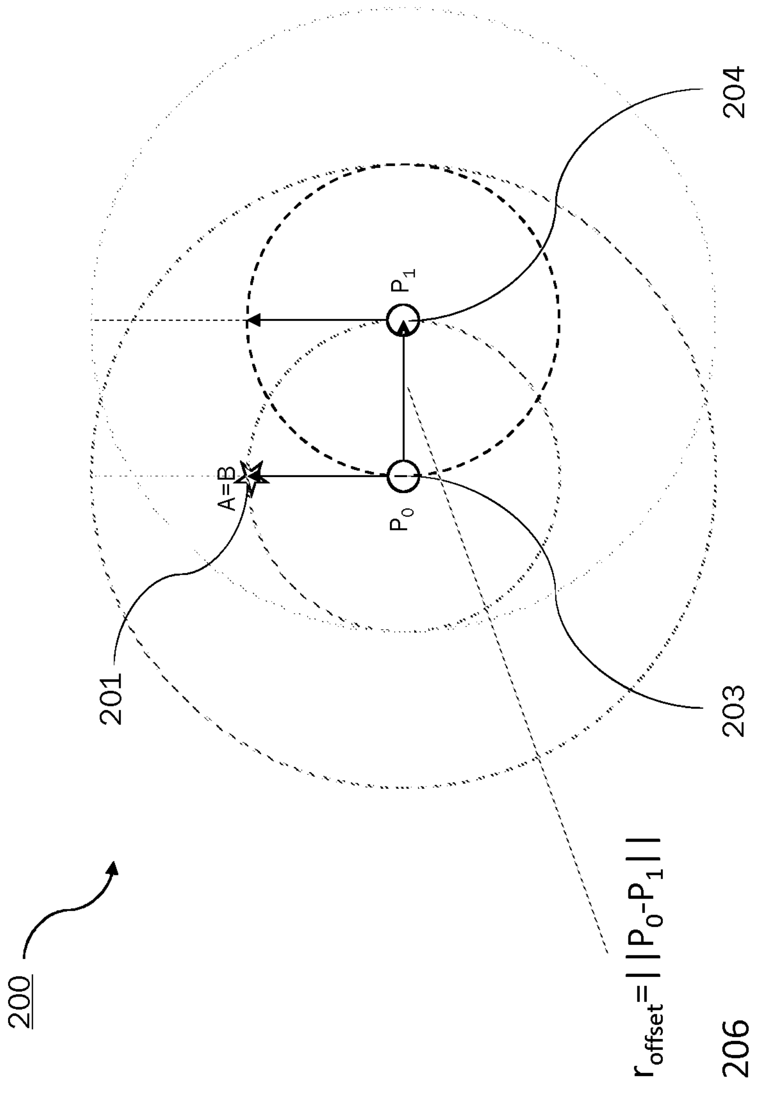
FIG. 2 schematically illustrates an example of an MPEG-H 3D Audio System in accordance with the present invention.

FIG. 1 and FIG. 2 illustrate the present invention based on headphone rendering (i.e., where the speakers are co-moving with the listener's head).

FIG. 1 shows an example of system behavior 100 as compliant with an MPEG-H 3D Audio system. This example assumes that the listener's head is located at position $P_0$ 103 at time $t_0$ and moves to position $P_1$ 104 at time $t_1>t_0$. Dashed circles around positions P0 and P1 indicate the allowable 3DoF+ movement area (e.g., with radius 0.5 m). Position A 101 indicates the signaled object position (at time $t_0$ and time $t_1$, i.e., the signaled object position is assumed to be constant over time). Position A also indicates the object position rendered by an MPEG-H 3D Audio renderer at time $t_0$. Position B 102 indicates the object position rendered by MPEG-H 3D Audio at time $t_1$. Vertical lines extending upwards from positions $P_0$ and $P_1$ indicate respective orientations (e.g., viewing directions) of the listener's head at times $t_0$ and $t_1$. The displacement of the user's head between position $P_0$ and position $P_1$ can be represented by $r_{offset}=\|P_0-P_1\|$ 106. With the listener being located at the default position (nominal listening position) $P_0$ 103 at time $t_0$, he/she would perceive the audio object (e.g., the mosquito) in the correct position A 101. If the user would move to position $P_1$ 104 at time $t_1$ he/she would perceive the audio object in the position B 102 if the MPEG-H 3D Audio processing is applied as currently standardized, which introduces the shown error $\delta_{AB}$ 105. That is, despite the listener's head movement, the audio object (e.g., mosquito) would still be perceived as being located directly in front of the listener's head (i.e., as substantially co-moving with the listener's head). Notably, the introduced error $\delta_{AB}$ 105 occurs regardless of the orientation of the listener's head.

FIG. 2 shows an example of system behavior relative to a system 200 of MPEG-H 3D Audio in accordance with the present invention. In FIG. 2, the listener's head is located at position $P_0$ 203 at time to and moves to position $P_1$ 204 at time $t_1>t_0$. The dashed circles around positions $P_0$ and $P_1$ again indicate the allowable 3DoF+ movement area (e.g., with radius 0.5 m). At 201, it is indicated that position A=B meaning that the signaled object position (at time to and time $t_1$, i.e., the signaled object position is assumed to be constant over time). The position A=B 201 also indicates the position of the object that is rendered by MPEG-H 3D Audio at time to and time $t_1$. Vertical arrows extending upwards from positions $P_0$ 203 and $P_1$ 204 indicate respective orientations (e.g., viewing directions) of the listener's head at times $t_0$ and $t_1$. With the listener being located at the initial/default position (nominal listening position) $P_0$ 203 at time to, he/she would perceive the audio object (e.g. the mosquito) in a correct position A 201. If the user would move to position $P_1$ 203 at time $t_1$ he/she would still perceive the audio object in the position B 201 which is similar (e.g., substantially equal) to position A 201 under the present invention. Thus, the present invention allows the position of the user to change over time (e.g., from position $P_0$ 203 to position $P_1$ 204) while still perceiving the sound from the same (spatially fixed) location (e.g., position A=B 201, etc.). In other words, the audio object (e.g., mosquito) moves relative to the listener's head, in accordance with (e.g., negatively correlated with) the listener's head movement. This enables the user to move around the audio object (e.g., mosquito) and to perceive the audio object from different angles or even sides. The displacement of the user's head between position $P_0$ and position $P_1$ can be represented by $r_{offset}=\|P_0-P_1\|$ 206.

Figure 3:
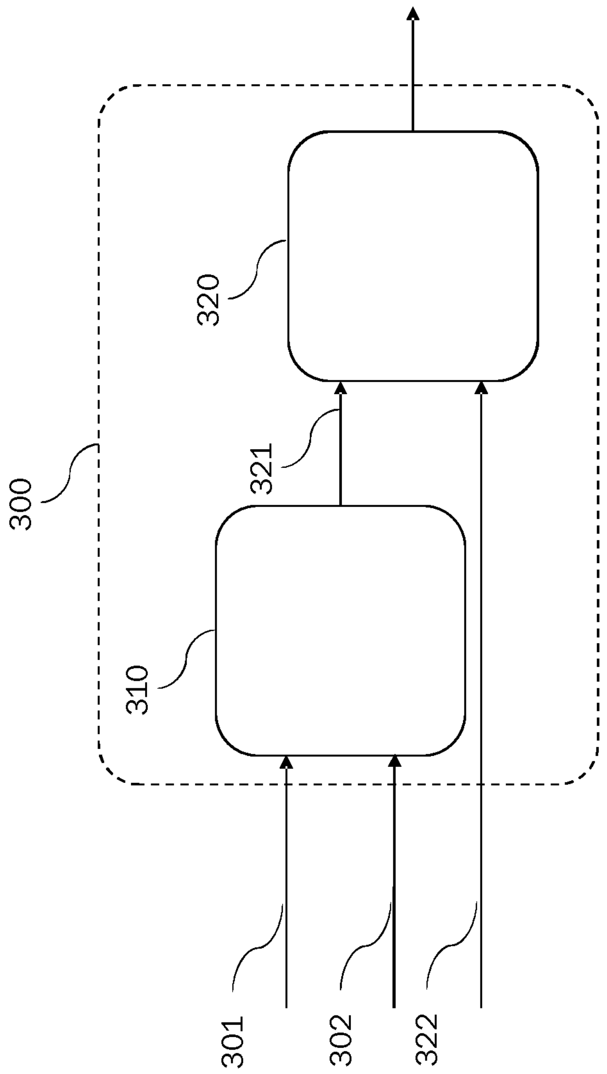
FIG. 3 schematically illustrates an example of an audio rendering system in accordance with the present invention.

FIG. 3 illustrates an example of an audio rendering system 300 in accordance with the present invention. The audio rendering system 300 may correspond to or include a decoder, such as a MPEG-H 3D audio decoder, for example. The audio rendering system 300 may include an audio scene displacement unit 310 with a corresponding audio scene displacement processing interface (e.g., an interface for scene displacement data in accordance with the MPEG-H 3D Audio standard). The audio scene displacement unit 310 may output object positions 321 for rendering respective audio objects. For example, the scene displacement unit may output object position metadata for rendering respective audio objects.

The audio rendering system 300 may further include an audio object renderer 320. For example, the renderer may be composed of hardware, software, and/or any partial or whole processing performed via cloud computing, including various services, such as software development platforms, servers, storage and software, over the internet, often referred to as the "cloud" that are compatible with the specification set out by the MPEG-H 3D Audio standard. The audio object renderer 320 may render audio objects to one or more (real or virtual) speakers in accordance with respective object positions (these object positions may be the modified or further modified object positions described below). The audio object renderer 320 may render the audio objects to headphones and/or loudspeakers. That is, the audio object renderer 320 may generate object waveforms according to a given reproduction format. To this end, the audio object renderer 320 may utilize compressed object metadata. Each object may be rendered to certain output channels according to its object position (e.g., modified object position, or further modified object position). The object positions therefore may also be referred to as channel positions of their audio objects. The audio object positions 321 may be included in the object position metadata or scene displacement metadata output by the scene displacement unit 310.

The processing of the present invention may be compliant with the MPEG-H 3D Audio standard. As such, it may be performed by an MPEG-H 3D Audio decoder, or more specifically, by the MPEG-H scene displacement unit and/or the MPEG-H 3D Audio renderer. Accordingly, the audio rendering system 300 of FIG. 3 may correspond to or include an MPEG-H 3D Audio decoder (i.e., a decoder that is compliant with the specification set out by the MPEG-H 3D Audio standard). In one example, the audio rendering system 300 may be an apparatus comprising a processor and a memory coupled to the processor, wherein the processor is adapted to implement an MPEG-H 3D Audio decoder. In particular, the processor may be adapted to implement the MPEG-H scene displacement unit and/or the MPEG-H 3D Audio renderer. Thus, the processor may be adapted to perform the processing steps described in the present disclosure (e.g., steps S510 to S560 of method 500 described below with reference to FIG. 5). In another example, the processing or audio rendering system 300 may be performed in the cloud.

The audio rendering system 300 may obtain (e.g., receive) listening location data 301. The audio rendering system 300 may obtain the listening location data 301 via an MPEG-H 3D Audio decoder input interface.

The listening location data 301 may be indicative of an orientation and/or position (e.g., displacement) of the listener's head. Thus, the listening location data 301 (which may also be referred to as pose information) may include listener orientation information and/or listener displacement information.

The listener displacement information may be indicative of the displacement of the listener's head (e.g., from a nominal listening position). The listener displacement information may correspond to or include an indication of the magnitude of the displacement of the listener's head from the nominal listening position, $r_{offset}=\|P_0-P_1\|$ 206 as illustrated in FIG. 2. In the context of the present invention, the listener displacement information indicates a small positional displacement of the listener's head from the nominal listening position. For example, an absolute value of the displacement may be not more than 0.5 m. Typically, this is the displacement of the listener's head from the nominal listening position that is achievable by the listener moving their upper body and/or head. That is, the displacement may be achievable for the listener without moving their lower body. For example, the displacement of the listener's head may be achievable when the listener is sitting in a chair, as indicated above. The displacement may be expressed in a variety of coordinate systems, such as, for example, in Cartesian coordinates (e.g., in terms of x, y, z) or in spherical coordinates (e.g., in terms of azimuth, elevation, radius). Alternative coordinate systems for expressing the displacement of the listener's head are feasible as well and should be understood to be encompassed by the present disclosure.

The listener orientation information may be indicative of the orientation of the listener's head (e.g., the orientation of the listener's head with respect to a nominal orientation/reference orientation of the listener's head). For example, the listener orientation information may comprise information on a yaw, a pitch, and a roll of the listener's head. Here, the yaw, pitch, and roll may be given with respect to the nominal orientation.

The listening location data 301 may be collected continuously from a receiver that may provide information regarding the translational movements of a user. For example, the listening location data 301 that is used at a certain instance in time may have been collected recently from the receiver. The listening location data may be derived/collected/generated based on sensor information. For example, the listening location data 301 may be derived/collected/generated by wearable and/or stationary equipment having appropriate sensors. That is, the orientation of the listener's head may be detected by the wearable and/or stationary equipment. Likewise, the displacement of the listener's head (e.g., from the nominal listening position) may be detected by the wearable and/or stationary equipment. The wearable equipment may be, correspond to, and/or include, a headset (e.g., an AR/VR headset), for example. The stationary equipment may be, correspond to, and/or include, camera sensors, for example. The stationary equipment may be included in a TV set or a set-top box, for example. In some embodiments, the listening location data 301 may be received from an audio encoder (e.g., a MPEG-H 3D Audio compliant encoder) that may have obtained (e.g., received) the sensor information.

In one example, the wearable and/or stationary equipment for detecting the listening location data 301 may be referred to as tracking devices that support head position estimation/detection and/or head orientation estimation/detection. There is a variety of solutions allowing to track user's head movements accurately using computer or smartphone cameras (e.g., based on face recognition and tracking "FaceTrackNoIR", "opentrack"). Also several Head-Mounted Display (HMD) virtual reality systems (e.g., HTC VIVE, Oculus Rift) have an integrated head tracking technology. Any of these solutions may be used in the context of the present disclosure.

It is also important to note that the head displacement distance in the physical world does not have to correspond one-to-one to the displacement indicated by the listening location data 301. In order to achieve a hyper-realistic effect (e.g., overamplified user motion parallax effect), certain applications may use different sensor calibration settings or specify different mappings between motion in the real and virtual spaces. Therefore, one can expect that a small physical movement results in a larger displacement in virtual reality in some use cases. In any case, it can be said that magnitudes of displacement in the physical world and in the virtual reality (i.e., the displacement indicated by the listening location data 301) are positively correlated. Likewise, the directions of displacement in the physical world and in the virtual reality are positively correlated.

The audio rendering system 300 may further receive (object) position information (e.g., object position data) 302 and audio data 322. The audio data 322 may include one or more audio objects. The position information 302 may be part of metadata for the audio data 322. The position information 302 may be indicative of respective object positions of the one or more audio objects. For example, the position information 302 may comprise an indication of a distance of respective audio objects relative to the user/listener's nominal listening position. The distance (radius) may be smaller than 0.5 m. For example, the distance may be smaller than 1 cm. If the position information 302 does not include the indication of the distance of a given audio object from the nominal listening position, the audio rendering system may set the distance of this audio object from the nominal listening position to a default value (e.g., 1 m). The position information 302 may further comprise indications of an elevation and/or azimuth of respective audio objects.

Each object position may be usable for rendering its corresponding audio object. Accordingly, the position information 302 and the audio data 322 may be included in, or form, object-based audio content. The audio content (e.g., the audio objects/audio data 322 together with their position information 302) may be conveyed in an encoded audio bitstream. For example, the audio content may be in the format of a bitstream received from a transmission over a network. In this case, the audio rendering system may be said to receive the audio content (e.g., from the encoded audio bitstream).

In one example of the present invention, metadata parameters may be used to correct processing of use-cases with a backwards-compatible enhancement for 3DoF and 3DoF+. The metadata may include the listener displacement information in addition to the listener orientation information. Such metadata parameters may be utilized by the systems shown in FIGS. 2 and 3, as well as any other embodiments of the present invention.

Backwards-compatible enhancement may allow for correcting the processing of use cases (e.g., implementations of the present invention) based on a normative MPEG-H 3D Audio Scene displacement interface. This means a legacy MPEG-H 3D Audio decoder/renderer would still produce output, even if not correct. However, an enhanced MPEG-H 3D Audio decoder/renderer according to the present invention would correctly apply the extension data (e.g., extension metadata) and processing and could therefore handle the scenario of objects positioned closely to the listener in a correct way.

Figure 4:
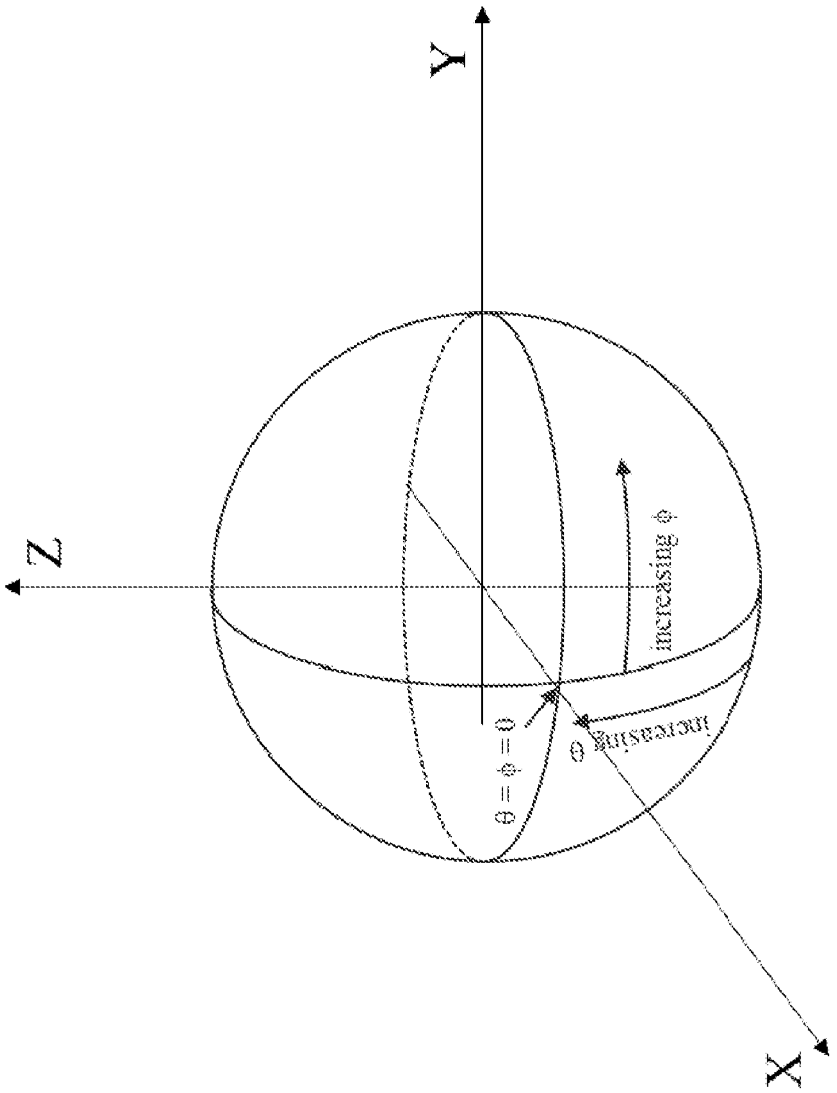
FIG. 4 schematically illustrates an example set of Cartesian coordinate axes and their relation to spherical coordinates.

In one example, the present invention relates to providing the data for small translational movements of a user's head in different formats than the one outlined below, and the formulas might be adapted accordingly. For example, the data may be provided in a format such as x, y, z-coordinates (in a Cartesian coordinate system) instead of azimuth, elevation and radius (in a Spherical coordinate system). An example of these coordinate systems relative to one another is shown in FIG. 4.

In one example, the present invention is directed to providing metadata (e.g., listener displacement information included in listening location data 301 shown in FIG. 3) for inputting a listener's head translational movement. The metadata may be used, for example, for an interface for scene displacement data. The metadata (e.g., listener displacement information) can be obtained by deployment of a tracking device that supports 3DoF+ or 6DoF tracking.

In one example, the metadata (e.g., listener displacement information, in particular displacement of the listener's head, or equivalently, scene displacement) may be represented by the following three parameters sd_azimuth, sd_elevation, and sd_radius, relating to azimuth, elevation and radius (spherical coordinates) of the displacement of the listener's head (or scene displacement).

The syntax for these parameters, is given by the following table.

TABLE 264b

Syntax of mpegh3daPositionalSceneDisplacementData( )

| Syntax | No. of bits | Mnemonic |
|---|---|---|
| mpegh3daPositionalSceneDisplacementData( ) | | |
| { | | |
| sd_azimuth; | 8 | Uimsbf |
| sd_elevation; | 6 | Uimsbf |
| sd_radius; | 4 | Uimsbf |
| } | | |
| sd_azimuth | This field defines the scene displacement azimuth position. This field can take values from −180 to 180.<br>$az_{offset} = (sd\_azimuth - 128) \cdot 1.5$<br>$az_{offset} = \min(\max(az_{offset}, -180), 180)$ | |
| sd_elevation | This field defines the scene displacement elevation position. This field can take values from −90 to 90.<br>$el_{offset} = (sd\_elevation - 32) \cdot 3.0$<br>$el_{offset} = \min(\max(el_{offset}, -90), 90)$ | |
| sd_radius | This field defines the scene displacement radius. This field can take values from 0.015626 to 0.25.<br>$r_{offset} = (sd\_radius + 1) / 16$ | |

In another example, the metadata (e.g., listener displacement information) may be represented by the following three parameters sd_x, sd_y, and sd_z in Cartesian coordinates, which would reduce processing of data from spherical coordinates to Cartesian coordinates. The metadata may be based on the following syntax:

| Syntax | No. of bits | Mnemonic |
|---|---|---|
| mpegh3daPositionalSceneDisplacementDataTrans( ) | | |
| { | | |
| sd_x; | 6 | uimsbf |
| sd_y; | 6 | uimsbf |
| sd_z; | 6 | uimsbf |
| } | | |

As described above, the syntax above or equivalents thereof syntax may signal information relating to rotations around the x, y, z axis.

In one example of the present invention, processing of scene displacement angles for channels and objects may be enhanced by extending the equations that account for positional changes of the user's head. That is, processing of object positions may take into account (e.g., may be based on, at least in part) the listener displacement information.

Figure 5:
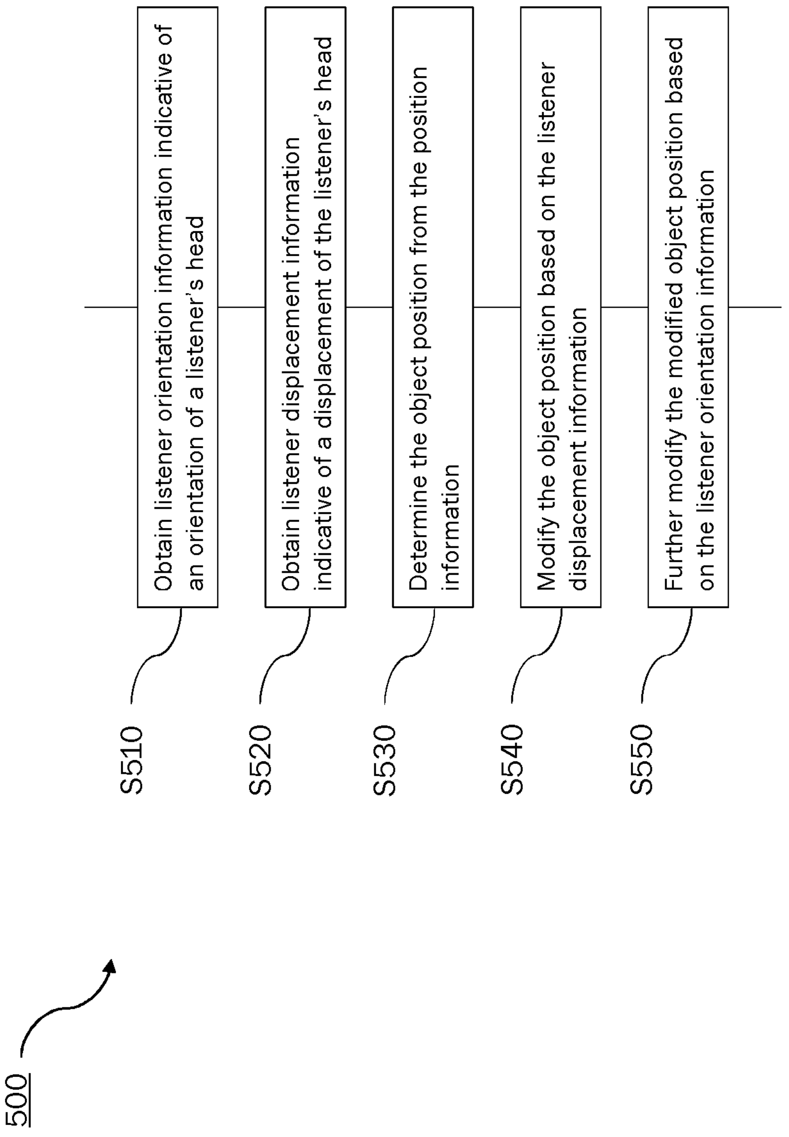
FIG. 5 is a flowchart schematically illustrating an example of a method of processing position information for an audio object in accordance with the present invention.

An example of a method 500 of processing position information indicative of an object position of an audio object is illustrated in the flowchart of FIG. 5. This method may be performed by a decoder, such as an MPEG-H 3D audio decoder. The audio rendering system 300 of FIG. 3 can stand as an example of such decoder.

As a first step (not shown in FIG. 5), audio content including an audio object and corresponding position information is received, for example from a bitstream of encoded audio. Then, the method may further include decoding the encoded audio content to obtain the audio object and the position information.

At step S510, listener orientation information is obtained (e.g., received). The listener orientation information may be indicative of an orientation of a listener's head.

At step S520, listener displacement information is obtained (e.g., received). The listener displacement information may be indicative of a displacement of the listener's head.

At step S530, the object position is determined from the position information. For example, the object position (e.g., in terms of azimuth, elevation, radius, or x, y, z or equivalents thereof) may be extracted from the position information. The determination of the object position may also be based, at least in part, on information on a geometry of a speaker arrangement of one or more (real or virtual) speakers in a listening environment. If the radius is not included in the position information for that audio object, the decoder may set the radius to a default value (e.g., 1 m).

In some embodiments, the default value may depend on the geometry of the speaker arrangement.

Notably, steps S510, S520, and S520 may be performed in any order.

At step S540, the object position determined at step S530 is modified based on the listener displacement information. This may be done by applying a translation to the object position, in accordance with the displacement information (e.g., in accordance with the displacement of the listener's head). Thus, modifying the object position may be said to relate to correcting the object position for the displacement of the listener's head (e.g., displacement from the nominal listening position). In particular, modifying the object position based on the listener displacement information may be performed by translating the object position by a vector that positively correlates to magnitude and negatively correlates to direction of a vector of displacement of the listener's head from a nominal listening position. An example of such translation is schematically illustrated in FIG. 2.

At step S550, the modified object position obtained at step S540 is further modified based on the listener orientation information. For example, this may be done by applying a rotational transformation to the modified object position, in accordance with the listener orientation information. This rotation may be a rotation with respect to the listener's head or the nominal listening position, for example. The rotational transformation may be performed by a scene displacement algorithm.

As noted above, the user offset compensation (i.e., modification of the object position based on the listener displacement information) is taken into consideration when applying the rotational transformation. For example, applying the rotational transformation may include:

- Calculation of the rotational transformation matrix (based on the user orientation, e.g., listener orientation information),
- Conversion of the object position from spherical to Cartesian coordinates,
- Application of the rotational transformation to the user-position-offset-compensated audio objects (i.e., to the modified object position), and
- Conversion of the object position, after rotational transformation, back from Cartesian to spherical coordinates.

As a further step S560 (not shown in FIG. 5), method 500 may comprise rendering the audio object to one or more real or virtual speakers in accordance with the further modified object position. To this end, the further modified object position may be adjusted to the input format used by an MPEG-H 3D Audio renderer (e.g., the audio object renderer 320 described above). The aforementioned one or more (real or virtual) speakers may be part of a headset, for example, or may be part of a speaker arrangement (e.g., a 2.1 speaker arrangement, a 5.1 speaker arrangement, a 7.1 speaker arrangement, etc.). In some embodiments, the audio object may be rendered to the left and right speakers of the headset, for example.

The aim of steps S540 and S550 described above is the following. Namely, modifying the object position and further modifying the modified object position is performed such that the audio object, after being rendered to one or more (real or virtual) speakers in accordance with the further modified object position, is psychoacoustically perceived by the listener as originating from a fixed position relative to a nominal listening position. This fixed position of the audio object shall be psychoacoustically perceived regardless of the displacement of the listener's head from the nominal listening position and regardless of the orientation of the listener's head with respect to the nominal orientation. In other words, the audio object may be perceived to move (translate) relative to the listener's head when the listener's head undergoes the displacement from the nominal listening position. Likewise, the audio object may be perceived to move (rotate) relative to the listener's head when the listener's head undergoes a change of orientation from the nominal orientation. Thereby, the listener can perceive a close audio object from different angles and distances, by moving their head.

Modifying the object position and further modifying the modified object position at steps S540 and S550, respectively, may be performed in the context of (rotational/translational) audio scene displacement, e.g., by the audio scene displacement unit 310 described above.

It is to be noted that certain steps may be omitted, depending on the particular use case at hand. For example, if the listening location data 301 includes only listener displacement information (but does not include listener orientation information, or only listener orientation information indicating that there is no deviation of the orientation of the listener's head from the nominal orientation), step S550 may be omitted. Then, the rendering at step S560 would be performed in accordance with the modified object position determined at step S540. Likewise, if the listening location data 301 includes only listener orientation information (but does not include listener displacement information, or only listener displacement information indicating that there is no deviation of the position of the listener's head from the nominal listening position), step S540 may be omitted. Then, step S550 would relate to modifying the object position determined at step S530 based on the listener orientation information. The rendering at step S560 would be performed in accordance with the modified object position determined at step S550.

Broadly speaking, the present invention proposes a position update of object positions received as part of object-based audio content (e.g., position information 302 together with audio data 322), based on listening location data 301 for the listener.

First, the object position (or channel position) p=(az, el, r) is determined. This may be performed in the context of (e.g., as part of) step 530 of method 500.

For channel-based signals the radius r may be determined as follows:

If the intended loudspeaker (of a channel of the channel-based input signal) exists in the reproduction loudspeaker setup and the distance of the reproduction setup is known, the radius r is set to the loudspeaker distance (e.g., in cm).

If the intended loudspeaker does not exist in the reproduction loudspeaker setup, but the distance of the reproduction loudspeakers (e.g., from the nominal listening position) is known, the radius r is set to the maximum reproduction loudspeaker distance.

If the intended loudspeaker does not exist in the reproduction loudspeaker setup and no reproduction loudspeaker distance is known, the radius r is set to a default value (e.g., 1023 cm).

For object-based signals the radius r is determined as follows:

If the object distance is known (e.g., from production tools and production formats and conveyed in prodMetadataConfig( )), the radius r is set to the known object distance (e.g., signaled by goa_bsObjectDistance[ ] (in cm) according to Table AMD5.7 of the MPEG-H 3D Audio standard).

TABLE AMD5.7

Syntax of goa_Production_Metadata ( )

| Syntax | No. of bits | Mnemonic |
|---|---|---|
| goa_Production_Metadata( ) | | |
| { | | |
| /* PRODUCTION METADATA CONFIGURATION */ | | |
| goa_hasObjectDistance; | 1 | Bslbf |
| if (goa_hasObjectDistance) { | | |
| for ( o = 0; o < goa_numberOfOutputObjects; o++ ) | | |
| { | | |
| goa_bsObjectDistance[o] | 8 | Uimsbf |
| } | | |
| } | | |
| } | | |

If the object distance is known from the position information (e.g., from object metadata and conveyed in object_metadata( ), the radius r is set to the object distance signaled in the position information (e.g., to radius[ ] (in cm) conveyed with the object metadata). The radius r may be signaled in accordance to the sections: "Scaling of Object Metadata" and "Limiting the Object Metadata" shown below.

Scaling of Object Metadata

As an optional step in the context of determining the object position, the object position p=(az, el, r) determined from the position information may be scaled. This may involve applying a scaling factor to reverse the encoder scaling of the input data for each component. This may be performed for every object. The actual scaling of an object position may be implemented in line with the pseudocode below:

```
descale_multidata( )
{
  for (o = 0; o < num_objects; o++)
    azimuth[o] = azimuth[o] * 1.5;
  for (o = 0; o < num_objects; o++)
    elevation[o] = elevation[o] * 3.0;
  for (o = 0; o < num_objects; o++)
    radius[o] = pow(2.0, (radius[o] / 3.0)) / 2.0;
  for (o = 0; o < num_objects; o++)
    gain[o] = pow(10.0, (gain[o] - 32.0) / 40.0);
  if (uniform_spread == 1)
  {
    for (o = 0; o < num_objects; o++)
      spread[o] = spread[o] * 1.5;
  }
  else
  {
    for (o = 0; o < num_objects; o++)
      spread_width[o] = spread_width[o] * 1.5;
    for (o = 0; o < num_objects; o++)
      spread_height[o] = spread_height[o] * 3.0;
    for (o = 0; o < num_objects; o++)
      spread_depth[o] = (pow(2.0,
      (spread_depth[o] / 3.0)) / 2.0) - 0.5;
  }
```

-continued

```
    for (o = 0; o < num_objects; o++)
      dynamic_object_priority[o] =
      dynamic_object_priority[o];
}
```

Limiting the Object Metadata

As a further optional step in the context of determining the object position, the (possibly scaled) object position p=(az, el, r) determined from the position information may be limited. This may involve applying limiting to the decoded values for each component to keep the values within a valid range. This may be performed for every object. The actual limiting of an object position may be implemented according to the functionality of the pseudocode below:

```
limit_range( )
{
  minval = −180;
  maxval = 180;
  for (o = 0; o < num_objects; o++)
    azimuth[o] = MIN(MAX
    (azimuth[o], minval), maxval);
  minval = −90;
  maxval = 90;
  for (o = 0; o < num_objects; o++)
    elevation[o] = MIN(MAX
    (elevation[o], minval), maxval);
  minval = 0.5;
  maxval = 16;
  for (o = 0; o < num_objects; o++)
    radius[o] = MIN(MAX
    (radius[o], minval), maxval);
  minval = 0.004;
  maxval = 5.957;
  for (o = 0; o < num_objects; o++)
    gain[o] = MIN(MAX(gain[o], minval), maxval);
  if (uniform_spread == 1)
  {
    minval = 0;
    maxval = 180;
    for (o = 0; o < num_objects; o++)
      spread[o] = MIN(MAX
      (spread[o], minval), maxval);
  }
  else
  {
    minval = 0;
    maxval = 180;
    for (o = 0; o < num_objects; o++)
      spread_width[o] = MIN(MAX
      (spread_width[o], minval), maxval);
    minval = 0;
    maxval = 90;
    for (o = 0; o < num_objects; o++)
      spread_height[o] = MIN(MAX
      (spread_height[o], minval), maxval);
    minval = 0;
    maxval = 15.5;
    for (o = 0; o < num_objects; o++)
      spread_depth[o] = MIN(MAX
      (spread_depth[o], minval), maxval);
  }
  minval = 0;
  maxval = 7;
  for (o = 0; o < num_objects; o++)
    dynamic_object_priority[o] = MIN(MAX
    (dynamic_object_priority[o], minval), maxval);
}
```

After that, the determined (and optionally, scaled and/or limited) object position p=(az, el, r) may be converted to a predetermined coordinate system, such as for example the coordinate system according to the 'common convention' where 0° azimuth is at the right ear (positive values going anti-clockwise) and 0° elevation is top of the head (positive values going downwards). Thus, the object position p may be converted to the position p' according to the 'common' convention. This results in object position p' with $$p' = (az', el', r)$$

$$az' = az + 90^\circ$$

$$el' = 90^\circ - el$$

with the radius r unchanged.

At the same time, the displacement of the listener's head indicated by the listener displacement information ($az_{offset}$, $el_{offset}$, $r_{offset}$) may be converted to the predetermined coordinate system. Using the 'common convention' this amounts to $$az'_{offset} = az_{offset} + 90^\circ$$

$$(el')_{offset} = 90^\circ - el_{offset}$$

with the radius $r_{offset}$ unchanged.

Notably, the conversion to the predetermined coordinate system for both the object position and the displacement of the listener's head may be performed in the context of step S530 or step S540.

The actual position update may be performed in the context of (e.g., as part of) step S540 of method 500. The position update may comprise the following steps:

As a first step the position p or, if a transfer to the predetermined coordinate system has been performed, the position p', is transferred to Cartesian coordinates (x, y, z). In the following, without intended limitation, the process will be described for the position p' in the predetermined coordinate system. Also, without intended limitation, the following orientation/direction of the coordinate axes may be assumed: x axis pointing to the right (seen from the listener's head when in the nominal orientation), y axis pointing straight ahead, and z axis pointing straight up. At the same time, the displacement of the listener's head indicated by the listener displacement information ($az'_{offset}$, $el'_{offset}$, $r_{offset}$) is converted to Cartesian coordinates.

As a second step, the object position in Cartesian coordinates is shifted (translated) in accordance with the displacement of the listener's head (scene displacement), in the manner described above. This may proceed via $$x = r \cdot \sin(el') \cdot \cos(az') + r_{offset} \cdot \sin(el'_{offset}) \cdot \cos(az'_{offset})$$

$$y = r \cdot \sin(el') \cdot \sin(az') + r_{offset} \cdot \sin(el'_{offset}) \cdot \sin(az'_{offset})$$

$$z = r \cdot \cos(el') + r_{offset} \cdot \cos(el'_{offset})$$

The above translation is an example of the modification of the object position based on the listener displacement information in step S540 of method 500.

The shifted object position in Cartesian coordinates is converted to spherical coordinates and may be referred to as p''. The shifted object position can be expressed, in the predetermined coordinate system according to the common convention as p''=(az'', el'', r').

When there are listener's head displacements that result in small radius parameter change (i.e. r'≈r), the modified position p" of the object can be redefined as p"=(az", el", r).

In another example, when there are large listener's head displacements that may result in a considerable radius parameter change (i.e. r'>>r), the modified position p" of the object can be also defined as p"=(az", el", r') instead of p"=(az", el", r) with a modified radius parameter r'.

The corresponding value of the modified radius parameter r' can be obtained from the listener's head displacement distance (i.e., $r_{offset}=\|P_0-P_1\|$) and the initial radius parameter (i.e., $r=\|P_0-A\|$), (see e.g., FIGS. 1 and 2). For example, the modified radius parameter r' can be determined based on the following trigonometrical relationship:

$$\frac{1}{2}$$

$$\frac{1}{2}$$

$$r' = (r^2 + r_{offset}^2)^{1/2}$$

The mapping of this modified radius parameter r' to the object/channel gains and their application for the subsequent audio rendering can significantly improve perceptual effects of the level change due to the user movements. Allowing for such modification of radius parameter r' allows for an "adaptive sweet-spot". This would mean that the MPEG rendering system dynamically adjusts the sweet-spot position according to the current location of the listener. In general, the rendering of the audio object in accordance with the modified (or further modified) object position may be based on the modified radius parameter r'. In particular, the object/channel gains for rendering the audio object may be based on (e.g., modified based on) the modified radius parameter r'.

In another example, during loudspeaker reproduction setup and rendering (e.g., at step S560 above), the scene displacement can be disabled. However, optional enabling of scene displacement may be available. This enables the 3DoF+ renderer to create the dynamically adjustable sweet-spot according to the current location and orientation of the listener.

Notably, the step of converting the object position and the displacement of the listener's head to Cartesian coordinates is optional and the translation/shift (modification) in accordance with the displacement of the listener's head (scene displacement) may be performed in any suitable coordinate system. In other words, the choice of Cartesian coordinates in the above is to be understood as a non-limiting example.

In some embodiments, the scene displacement processing (including the modifying the object position and/or the further modifying the modified object position) can be enabled or disabled by a flag (field, element, set bit) in the bitstream (e.g., a useTrackingMode element). Subclauses "17.3 Interface for local loudspeaker setup and rendering" and "17.4 Interface for binaural room impulse responses (BRIRs)" in ISO/IEC 23008-3 contain descriptions of the element useTrackingMode activating the scene displacement processing. In the context of the present disclosure, the useTrackingMode element shall define (subclause 17.3) if a processing of scene displacement values sent via the mpegh3daSceneDisplacementData( ) and mpegh3daPositionalSceneDisplacementData( ) interfaces shall happen or not. Alternatively or additionally (subclause 17.4) the useTrackingMode field shall define if a tracker device is connected and the binaural rendering shall be processed in a special headtracking mode, meaning a processing of scene displacement values sent via the mpegh3daSceneDisplacementData( ) and mpegh3daPositionalSceneDisplacementData( ) interfaces shall happen.

The methods and systems described herein may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described herein are portable electronic devices or other consumer equipment which are used to store and/or render audio signals.

While the present document makes reference to MPEG and particularly MPEG-H 3D Audio, the present disclosure shall not be construed to be limited to these standards. Rather, as will be appreciated by those skilled in the art, the present disclosure can find advantageous application also in other standards of audio coding.

Moreover, while the present document makes frequent reference to small positional displacement of the listener's head (e.g., from the nominal listening position), the present disclosure is not limited to small positional displacements and can, in general, be applied to arbitrary positional displacement of the listener's head.

It should be noted that the description and drawings merely illustrate the principles of the proposed methods, systems, and apparatus. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

In addition to the above, various example implementations and example embodiments of the invention will become apparent from the enumerated example embodiments (EEEs) listed below, which are not claims.

A first EEE relates to a method for decoding an encoded audio signal bitstream, said method comprising: receiving, by an audio decoding apparatus 300, the encoded audio signal bitstream (302, 322), wherein the encoded audio signal bitstream comprises encoded audio data (322) and metadata corresponding to at least one object-audio signal (302); decoding, by the audio decoding apparatus (300), the encoded audio signal bitstream (302, 322) to obtain a representation of a plurality of sound sources; receiving, by the audio decoding apparatus (300), listening location data (301); generating, by the audio decoding apparatus (300), audio object positions data (321), wherein the audio object positions data (321) describes a plurality of sound sources relative to a listening location based on the listening location data (301).

A second EEE relates to the method of the first EEE, wherein the listening location data (301) is based on a first set of a first translational position data and a second set of a second translational position and orientation data.

A third EEE relates to the method of the second EEE, wherein either the first translational position data or the second translational position data is based on least one of a set of spherical coordinates or a set of Cartesian coordinates.

A fourth EEE relates to the method of the first EEE, wherein listening location data (301)) is obtained via an MPEG-H 3D Audio decoder input interface.

A fifth EEE relates to the method of the first EEE, wherein the encoded audio signal bitstream includes MPEG-H 3D Audio bitstream syntax elements, and wherein the MPEG-H 3D Audio bitstream syntax elements include the encoded audio data (322) and the metadata corresponding to at least one object-audio signal (302).

A sixth EEE relates to the method of the first EEE, further comprising rendering, by the audio decoding apparatus (300) to a plurality of loudspeakers the plurality of sound sources, wherein the rendering process is complaint with at least the MPEG-H 3D Audio standard.

A seventh EEE relates to the method of the first EEE, further comprises converting, by the audio decoding apparatus (300), based on a translation of the listening location data (301), a position p corresponding to the at least one object-audio signal (302) to a second position p" corresponding to the audio object positions (321).

An eighth EEE relates to the method of the seventh EEE, wherein the position p' of the audio object positions in a predetermined coordinate system (e.g., according to the common convention) is determined based on:

$$p' = (az', el', r)$$

$$az' = az + 90°$$

$$el' = 90° - el$$

$$az'_{offset} = az_{offset} + 90°$$

$$(el')_{offset} = 90° - el_{offset}$$

wherein az corresponds to a first azimuth parameter, el corresponds to a first elevation parameter and r corresponds to a first radius parameter, herein az' corresponds to a second azimuth parameter, el' corresponds to a second elevation parameter and r' corresponds to a second radius parameter, wherein $az_{offset}$ corresponds to a third azimuth parameter, $el_{offset}$ corresponds to a third elevation parameter, and wherein $az'_{offset}$ corresponds to a fourth azimuth parameter, $el'_{offset}$ corresponds to a fourth elevation parameter.

A ninth EEE relates to the method of the eighth EEE, wherein the shifted audio object position p" (321) of the audio object position (302) is determined, in Cartesian coordinates (x, y, z), based on:

$$x = r \cdot \sin(el') \cdot \cos(az') + x_{offset}$$

$$y = r \cdot \sin(el') \cdot \sin(az') + y_{offset}$$

$$z = r \cdot \cos(el') + z_{offset}$$

wherein the Cartesian position (x, y, z) consist of x, y and z parameters and wherein $x_{offset}$ relates to a first x-axis offset parameter, $y_{offset}$ relates to a first y-axis offset parameter, and $z_{offset}$ relates to a first z-axis offset parameter.

A tenth EEE relates to the method of the ninth EEE, where in the parameters $x_{offset}$, $y_{offset}$ and $z_{offset}$ are based on $$x_{offset} = r_{offset} \cdot \sin(el'_{offset}) \cdot \cos(az'_{offset})$$

$$y_{offset} = r_{offset} \cdot \sin(el'_{offset}) \cdot \sin(az'_{offset})$$

$$z_{offset} = r_{offset} \cdot \cos(el'_{offset})$$

An eleventh EEE relates to the method of the seventh EEE, wherein the azimuth parameter $az_{offset}$ relates to a scene displacement azimuth position and is based on:

$$az_{offset} = (\text{sd\_azimuth} - 128) \cdot 1.5$$

$$az_{offset} = \min(\max(az_{offset}, -180), 180)$$

wherein sd_azimuth is an azimuth metadata parameter indicating MPEG-H 3DA azimuth scene displacement, wherein the elevation parameter $el_{offset}$ relates to a scene displacement elevation position and is based on:

$$el_{offset} = (\text{sd\_elevation} - 32) \cdot 3$$

$$el_{offset} = \min(\max(el_{offset}, -90), 90)$$

wherein sd_elevation is an elevation metadata parameter indicating MPEG-H 3DA elevation scene displacement, wherein the radius parameter $r_{offset}$ relates to a scene displacement radius and is based on:

$$r_{offset} = (\text{sd\_radius} + 1)/16$$

wherein sd_radius is a radius metadata parameter indicating MPEG-H 3DA radius scene displacement, and wherein parameters X and Y are scalar variables.

A twelfth EEE relates to the method of the tenth EEE, wherein the $x_{offset}$ parameter relates to a scene displacement offset position sd_x into the direction of an x-axis; the $y_{offset}$ parameter relates to a scene displacement offset position sd_y into the direction of the y-axis; and the $z_{offset}$ parameter relates to a scene displacement offset position sd_z into the direction of the z-axis.

A thirteenth EEE relates to the method of the first EEE, further comprising interpolating, by the audio decoding apparatus, the first position data relating to the listening location data (301) and the object-audio signal (102) at an update rate.

A fourteenth EEE relates to the method of the first EEE, further comprising determining, by the audio decoding apparatus 300, efficient entropy coding of listening location data (301).

A fifteenth EEE relates to the method of the first EEE, wherein the position data relating to the listening location (301) is derived based on sensor information.

The invention claimed is:

1. A method of processing position information indicative of an object position of an audio object, wherein the processing is performed using an MPEG-H 3D Audio decoder, wherein the object position is usable for rendering of the audio object, the method comprising:

obtaining listener orientation information indicative of an orientation of a listener's head, wherein the listener orientation information comprises information on a yaw, a pitch, and a roll of the listener's head;

obtaining listener displacement information indicative of a displacement of the listener's head relative to a nominal listening position, via an MPEG-H 3D Audio decoder input interface;

determining the object position from the position information;

modifying the object position based on the listener displacement information by applying a translation to the object position;

further modifying the modified object position based on the listener orientation information, wherein when the listener displacement information is indicative of a displacement of the listener's head from the nominal listening position by a small positional displacement, the small positional displacement having an absolute value of 0.5 meter or less than 0.5 meter, a distance between the audio object position and a listening position after displacement of the listener's head is equal to a distance between the modified audio object position and the nominal listening position; and rendering the audio object to one or more real or virtual speakers in accordance with the further modified object position.

2. The method according to claim 1, wherein:

modifying the object position and further modifying the modified object position is performed such that the audio object, after being rendered to one or more real or virtual speakers in accordance with the further modified object position, is psychoacoustically perceived by the listener as originating from a fixed position relative to the nominal listening position, regardless of the displacement of the listener's head from the nominal listening position and the orientation of the listener's head with respect to a nominal orientation.

3. The method according to claim 1, wherein:

modifying the object position based on the listener displacement information is performed by translating the object position of an equal displacement of the listener's head from the nominal listening position, but in an opposite direction.

4. The method according to claim 1, wherein:

the listener displacement information is indicative of a displacement of the listener's head from the nominal listening position that is achievable by the listener moving their upper body and/or head.

5. The method according to claim 1, further comprising:

detecting the orientation of the listener's head by wearable and/or stationary equipment.

6. The method according to claim 1, comprising:

detecting the displacement of the listener's head from the nominal listening position by wearable and/or stationary equipment.

7. The method according to claim 1, wherein the distance between the modified audio object position and the listening position after displacement is mapped to gains for modification of an audio level.

8. A non-transitory computer readable media comprising instructions which when the software is executed by a digital signal processor or microprocessor cause the digital signal processor or microprocessor to carry out the method of claim 1.

9. An MPEG-H 3D Audio decoder for processing position information indicative of an object position of an audio object, wherein the object position is usable for rendering of the audio object, the decoder comprising a processor and a memory coupled to the processor, wherein the processor is adapted to:

obtain listener orientation information indicative of an orientation of a listener's head, wherein the listener orientation information comprises information on a yaw, a pitch, and a roll of the listener's head;

obtain listener displacement information indicative of a displacement of the listener's head relative to a nominal listening position, via an MPEG-H 3D Audio decoder input interface;

determine the object position from the position information;

modify the object position based on the listener displacement information by applying a translation to the object position;

further modify the modified object position based on the listener orientation information, wherein when the listener displacement information is indicative of a displacement of the listener's head from the nominal listening position by a small positional displacement, the small positional displacement having an absolute value of 0.5 meter or less than 0.5 meter, wherein a distance between the audio object position and a listening position after displacement of the listener's head is equal to a distance between the modified audio object position and the nominal listening position; and render the audio object to one or more real or virtual speakers in accordance with the further modified object position.

* * * * *